US006430917B1

United States Patent
Platts

(10) Patent No.: US 6,430,917 B1
(45) Date of Patent: Aug. 13, 2002

(54) SINGLE ROTOR TURBINE ENGINE

(75) Inventor: David A. Platts, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/779,977

(22) Filed: Feb. 9, 2001

(51) Int. Cl.[7] .............................................. F02C 3/04
(52) U.S. Cl. ...................................... 60/39.43; 60/804
(58) Field of Search ............................... 60/39.43, 804, 60/726, 805

(56) References Cited

U.S. PATENT DOCUMENTS

| | | | |
|---|---|---|---|
| 2,138,220 A | * 11/1938 | Trumpler | 60/41 |
| 2,537,344 A | * 1/1951 | Gruss | 230/116 |
| 2,595,505 A | * 5/1952 | Bachle | 60/39.36 |
| 3,077,075 A | * 2/1963 | Turanciol | 60/39.35 |
| 3,093,084 A | * 6/1963 | Derderian | 103/87 |
| 3,103,325 A | * 9/1963 | Leutzinger | 244/12 |
| 3,130,546 A | * 4/1964 | Hovorka | 60/39.36 |
| 3,156,093 A | * 11/1964 | Chapman | 60/39.43 |
| 3,709,629 A | 1/1973 | Traut | 415/56 |
| 3,811,796 A | 5/1974 | Coleman, Jr. et al. | 417/64 |
| 3,892,069 A | * 7/1975 | Hansford | 60/226 |
| 3,899,875 A | 8/1975 | Oklejas et al. | 60/39.51 R |
| 3,940,924 A | 3/1976 | Miyada | 60/39.08 |
| 3,958,899 A | 5/1976 | Coleman, Jr. et al. | 417/64 |
| 3,999,377 A | 12/1976 | Oklejas et al. | 60/39.51 R |
| 4,002,414 A | 1/1977 | Coleman, Jr. et al. | 416/223 A |
| 4,034,560 A | 7/1977 | Chute | 60/39.08 |
| 4,051,671 A | 10/1977 | Brewer | 60/262 |
| 4,070,824 A | 1/1978 | Traut | 60/39.43 |
| 4,086,760 A | 5/1978 | Chute | 60/39.36 |
| 4,177,638 A | 12/1979 | Wood | 60/39.51 H |
| 4,463,551 A | 8/1984 | Morris | 60/39.35 |
| 4,482,303 A | 11/1984 | Acosta | 417/406 |
| 4,522,562 A | 6/1985 | Glowacki et al. | 416/95 |
| 4,757,682 A | 7/1988 | Bahniuk | 60/39.43 |
| 4,923,370 A | 5/1990 | Larson | 416/95 |
| 5,185,541 A | 2/1993 | Jensen | 310/11 |
| 5,207,054 A | * 5/1993 | Rodgers | 60/39.36 |
| 5,280,703 A | * 1/1994 | Corrado | 60/39.36 |
| 5,363,644 A | * 11/1994 | Shekleton | 60/39.36 |
| 5,466,123 A | 11/1995 | Rose | 415/182.1 |
| 5,664,413 A | * 9/1997 | Kington | 60/39.32 |
| 5,855,112 A | 1/1999 | Bannai et al. | 60/39.511 |
| 5,932,940 A | 8/1999 | Epstein et al. | 310/40 MM |
| 5,996,336 A | 12/1999 | Hamedani | 60/226.1 |

OTHER PUBLICATIONS

Sanders, Richard, "What Is So Attractive about Micro–turbines?", *Powerline Magazine*, Dec. 1998, pp. 27–34.
van den Hout, Franklin and Jo Koullen, "A Tiny Turbojet for Model Aircraft," *Mechanical Engineering*, Aug. 1997.

* cited by examiner

*Primary Examiner*—Ehud Gartenberg
(74) *Attorney, Agent, or Firm*—Gemma Morrison Bennett; Milton D. Wyrick

(57) ABSTRACT

There has been invented a turbine engine with a single rotor which cools the engine, functions as a radial compressor, pushes air through the engine to the ignition point, and acts as an axial turbine for powering the compressor. The invention engine is designed to use a simple scheme of conventional passage shapes to provide both a radial and axial flow pattern through the single rotor, thereby allowing the radial intake air flow to cool the turbine blades and turbine exhaust gases in an axial flow to be used for energy transfer. In an alternative embodiment, an electric generator is incorporated in the engine to specifically adapt the invention for power generation. Magnets are embedded in the exhaust face of the single rotor proximate to a ring of stationary magnetic cores with windings to provide for the generation of electricity. In this alternative embodiment, the turbine is a radial inflow turbine rather than an axial turbine as used in the first embodiment. Radial inflow passages of conventional design are interleaved with radial compressor passages to allow the intake air to cool the turbine blades.

1 Claim, 9 Drawing Sheets

SINGLE ROTOR TURBINE ENGINE

This invention was made with government support under Contract No. W-7405-ENG-36 awarded by the U.S. Department of Energy. The government has certain rights in the invention.

TECHNICAL FIELD

This invention relates to gas turbine engines and more particularly to gas turbine engines which have only a single rotor that serves both as a radial compressor and as an axial turbine.

BACKGROUND ART

Simple turbine engines generally have two rotors or sets of rotors, one for compressing the intake air and the other for using some of the exhaust energy to power the compressor.

Large turbines with over 500 kW output power such as those in commercial aircraft and electric power generating stations use both a multistage axial compressor and an axial turbine. Long shafts necessary to accommodate two separate rotor blades in large state-of-the-art turbine engines are difficult to keep balanced and wear out. Shaft whip, vibration, and overheated bearings are common problems.

Either axial or radial turbines are employed in small turbine engines used for local power generators for backup and peak shedding. In these turbine engines, damage to rotor blades by hot exhaust temperatures is common.

The higher the firing temperature of a turbine engine, the more efficient it generally is. However, the firing temperature is limited by the ability of the turbine nozzles and blades to withstand the heat of the exhaust gases which must pass through them. Usually, almost a third of the air moved through a large turbine is used for cooling turbine blades rather than for combustion. Various high temperature materials and cooling schemes have been used to permit increased firing temperatures. Still, efficiency close to the theroretical maximum has not been achieved, the high temperature materials are generally expensive and rare, and the cooling schemes are generally costly and wasteful.

Most turbine blade and bearing cooling schemes involve use of any of a variety of patterns of cooling channels bored in the blades. For example, U.S. Pat. No. 4,522,562, issued to Glowacki and Mandet, Jun. 11, 1985, discloses a cooling scheme in which a turbine disc is equipped with a set of channels bored close to each of two sides of the disc and in conformity with the profile of the disc, with each set of channels carrying the cooling air of the turbine blades in order to superficially cool the disc.

There also have been developed turbine engines with turbine wheels or rotors which function both as compressors and turbine sections. For example, in the turbine described in U.S. Pat. No. 4,757,682, issued to Bahniuk, Jul. 19, 1988, fluid flow is redirected over the compressor section to effect multiple stages of compression and the same passages are used for both compression air flow and exhaust air flow. There is no suggestion that separate intake and exhaust passages could be interleaved in the same rotor.

U.S. Pat. No. 3,709,629, issued to Traut, Jan. 9, 1973, and related U.S. Pat. No. 4,070,824, issued to Traut, Jan. 31, 1978, disclose a gas turbine having a rotor serving as both compressor and turbine. The Traut turbine engine utilizes non-rotating arcuate members about the periphery of the rotor to direct the flow of combustion products against rotor blades to cause rotation of the rotor. The arcuate members help cool the turbine rotor blades, and also form passages for the subsequent exhausting of the combustion products. This is accomplished using a complex ducting scheme unlike that of the present invention.

There is still a need for lighter, more efficient gas turbine engines with simple design which can run at cooler temperatures and which are less susceptible to wear from multiple rotors on long shafts.

Therefore, it is an object of this invention to provide a single rotor gas turbine engine.

It is another object of this invention to provide efficient gas turbine engines which can run at cooler temperatures and which are less susceptible to wear from multiple rotors on long shafts.

It is a further object of this invention to provide single rotor gas turbine engines with less complex flow patterns.

It is yet another object of this invention to provide gas turbine engines specifically adapted for generation of electricity.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DISCLOSURE OF INVENTION

To achieve the foregoing and other objects, and in accordance with the purposes of the present invention, as embodied and broadly described herein, there has been invented a turbine engine with a single rotor (rotating disk impeller) which cools the engine, functions as a radial compressor, pushes air through the engine to the ignition point, and acts as an axial turbine for powering the compressor. The invention engine is designed to use a simple scheme of conventional passage shapes to provide both a radial and axial flow pattern through the single rotor, thereby allowing the radial intake air flow to cool the turbine blades and turbine exhaust gases in an axial flow to be used for energy transfer.

In an alternative embodiment, the invention has an electric generator incorporated to specifically adapt the invention for power generation. In this second embodiment, an adaptation of the invention engine has magnets embedded in the exhaust face of the single rotor proximate to a ring of stationary magnetic cores with windings to provide for the generation of electricity. hi this alternative embodiment, the turbine is a radial inflow turbine rather than an axial turbine as used in the first embodiment of the present invention. Radial inflow passages of conventional design are interleaved with radial compressor passages to allow the intake air to cool the turbine blades.

BRIEF DESCRIPTION OF THE DRAWINGS

The accompanying drawings, which are incorporated in and form a part of the specification, illustrate a embodiments of the present invention and, together with the description, serve to explain the principles of the invention. In the drawings.

BEST MODES FOR CARRYING OUT THE INVENTION

Figure 1:
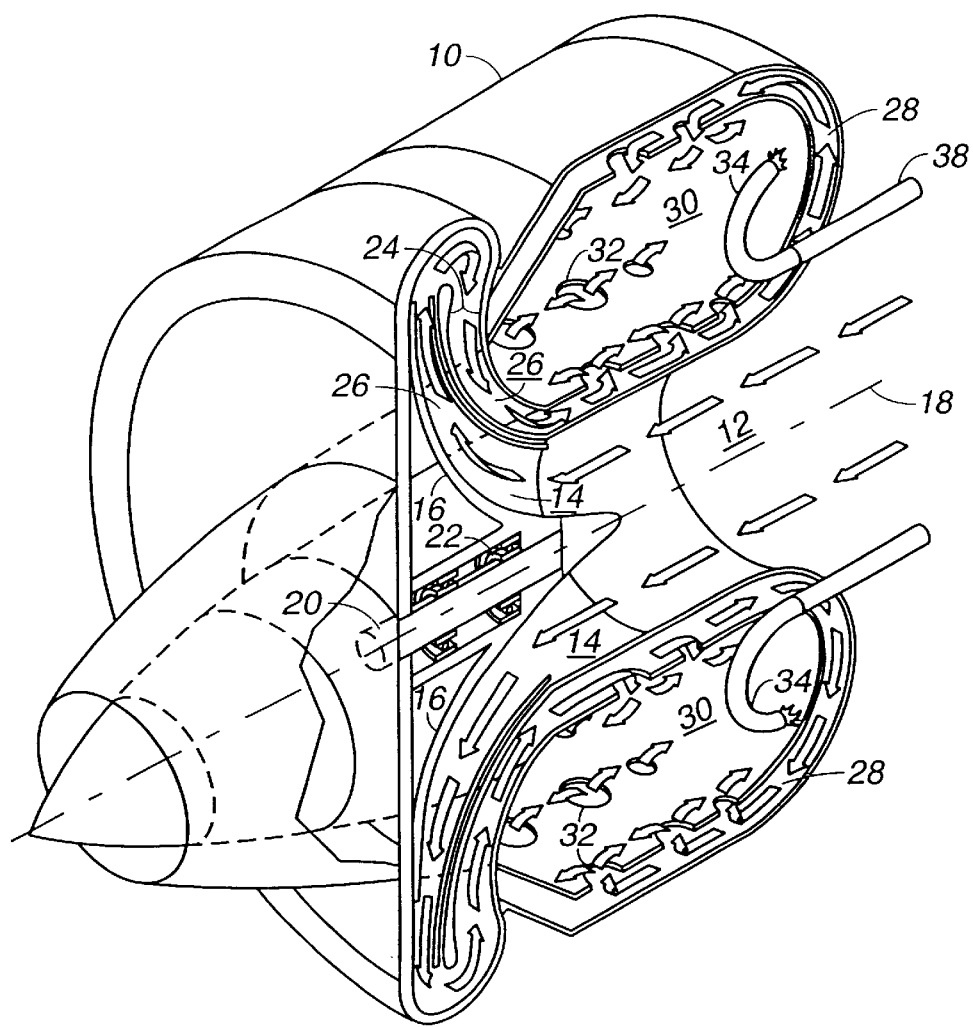
FIG. 1 is an isometric cutaway view of a turbine engine in accordance with the first embodiment of the invention showing a cross section having only the intake flow pattern.

There has been invented a single rotor gas turbine engine which can run at cooler temperatures and which eliminates the need for multiple rotors on long shafts. The invention turbine engines have less complex construction and provide turbine section cooling and heat recycling. Alternative embodiments of the invention turbine engines are specifically adapted for generation of electricity.

In a first embodiment, the invention turbine engine is designed to provide both a radial and axial flow pattern through the single rotor allowing the intake air to cool the turbine blades. The first embodiment exhausts a hot gas flow that can be used to produce thrust or drive a separate turbine. In a second embodiment, the single rotor in the turbine engine provides for two separate radial flow patterns to both cool the turbine blades and allow energy extraction from the rotor to generate electricity.

In the invention turbine engines, air is pulled by radial compressor passages in the single rotor (rotating disk impeller) into a radial flow through the single rotor where all of the air brought into the engine is used for cooling the axial or radial turbine blades by conduction of heat from combustion gases through the rotor material, especially blades, into the intake air. This allows the use of higher firing temperatures for more efficiency and for the use of less exotic metals in the rotor. Conduction of the heat from combustion exhaust through the rotor material also adds heat to the intake air, thereby functioning as a preheating step for the combustion.

While the air is being pulled by the single rotor into the radial flow through the single rotor, all of the intake air from the radial flow across the rotor is compressed using the radial passages of the rotor in the same manner as radial passages in a conventional centrifugal compressor. The compressed air is then directed, using a radially inward flow path, into a diffuser which converts the air flow to a slower, higher pressure air flow.

The inward radial flow of air in the stationary diffuser cools nozzle guide vanes in the diffuser. Cooling the nozzle guide vanes transfers more heat to the intake air, thus further preheating the air provided to the combustion chamber. The high pressure air flow is directed into a conventional gas turbine engine type combustion chamber where it is burned with the fuel.

In the first embodiment, the hot gases from the combustion chamber flow back out of the turbine engine through axial passages interleaved between the radial passages of the diffuser. The axial passages in the diffuser form the nozzle guide vanes. The nozzle guide vanes add rotation to the combustion gases before the combustion gases contact the blades of the turbine. In the first embodiment of the invention, the rotor has axial turbine passages interleaved between the radial compressor passages in the rotor. The radial compressor is driven by some of the energy in the exhausted combustion products, similar to the manner in which a conventional gas turbine is driven. The combustion products exhaust (jet exhaust) can then be used to propel an aircraft or rotate a power turbine in the usual manner. Power can also be extracted from the single rotor by a shaft.

As described with respect to the second embodiment herein, power can also be extracted by incorporating an electrical generator in the device. It is presently preferred to use radial turbine passages for the exhaust air flow in this alternative configuration of the invention since more power can be extracted using a radial turbine.

Using a single rotor to combine the rotating parts of the turbine engine eliminates the need for a long shaft and the dynamic problems associated therewith. In the invention turbine engines, only a single rotating part needs to be balanced. The bearings are located where intake air will keep them cool.

With reference to the drawings, FIG. 1 shows an orthogonal cross section taken through the intake passages of a first embodiment of the invention turbine engine. As depicted in FIG. 1, within an engine housing 10 a passage for intake air 12 is fluidly connected to radially disposed passages (radial compressor passages 14) in a rotor 16. The rotor 16 is positioned to rotate about an axis of rotational symmetry 18 on a stationary shaft 20. The rotor 16 is supported by bearings 22. The intake air is compressed using the radial compressor passages 14 in the rotor 16 in the same manner as air is compressed in a conventional centrifugal compressor.

Still with reference to FIG. 1, a stationary diffuser 24 converts the velocity of the air coming from the radial compressor passages 14 in the rotor 16 to a radially inward diffuser flow path 26, thereby producing a slower, higher pressure air flow. The pressurized air is conducted into a space 28 between the housing 10 and a conventional gas turbine type combustion chamber 30. The combustion chamber 30 has openings 32 through which the pressurized air enters the combustion chamber 30. The air is contacted with fuel from a fuel inlet 34 into the combustion chamber 30 and ignited.

Figure 2:
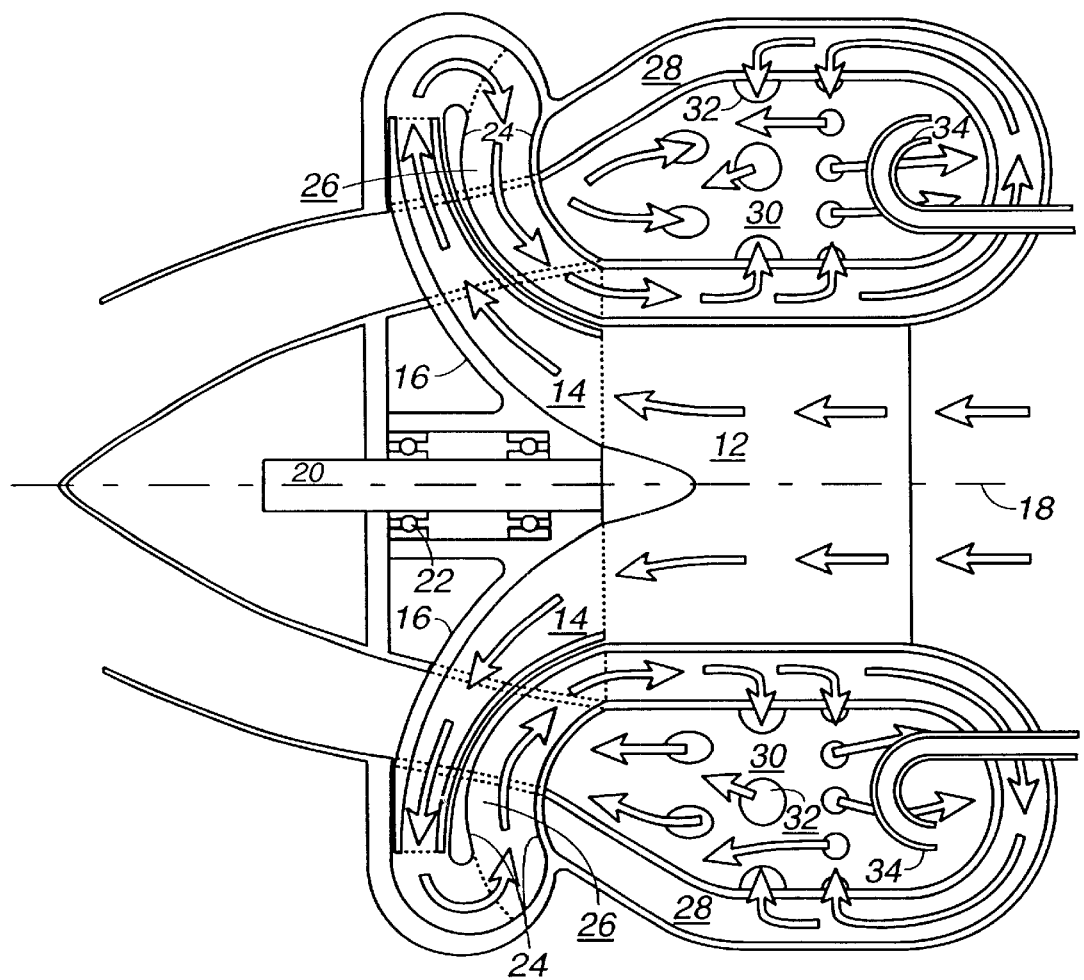
FIG. 2 is an orthogonal view of the cross section shown in FIG. 1.

FIG. 2 is an orthogonal view of the cross section shown in FIG. 1, to give another perspective of the intake air flow pattern in the first embodiment of the invention. All of the features of FIG. 1 are shown in FIG. 2 and are called out using the same numerals.

Figure 3:
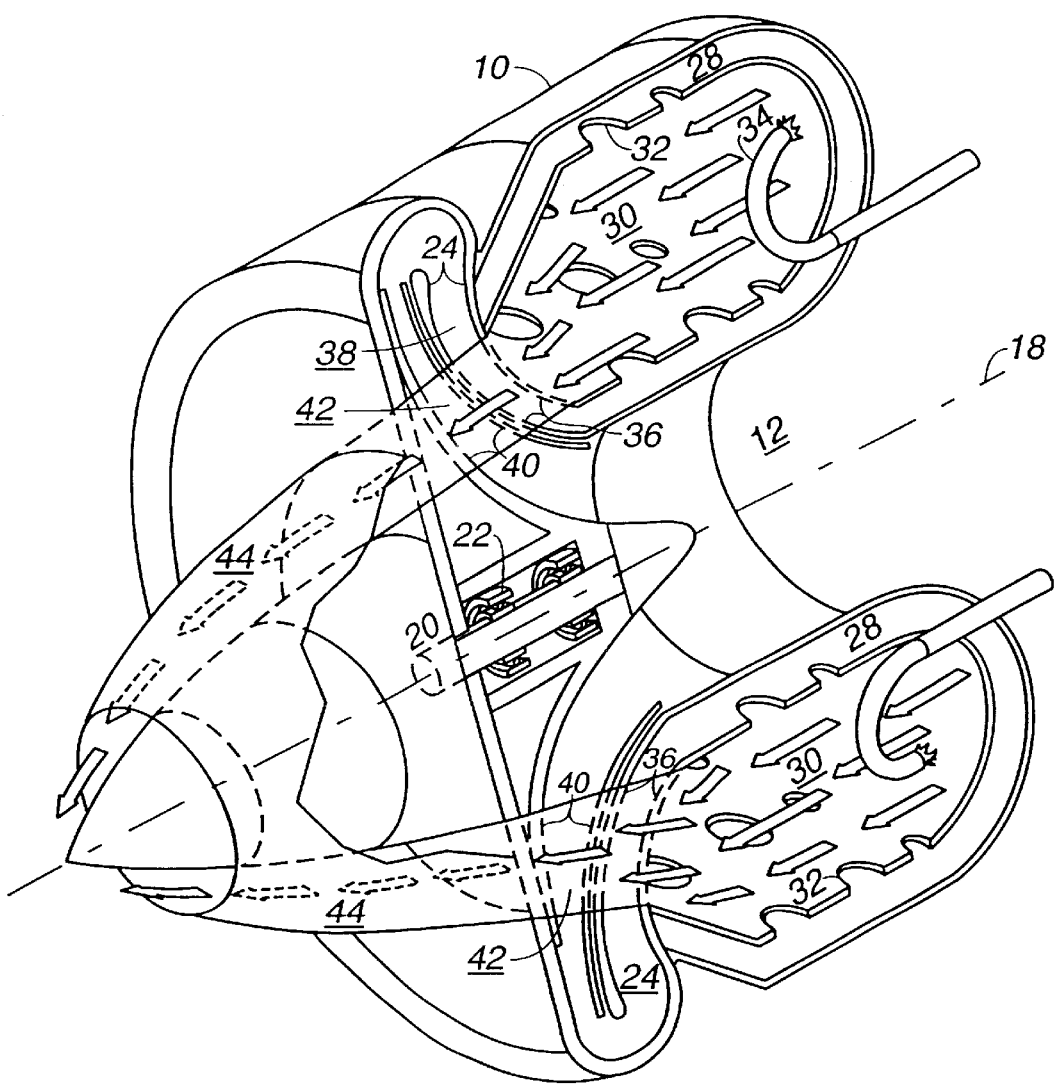
FIG. 3 is an isometric cutaway view of a turbine engine in accordance with the first embodiment of the invention showing a cross section having only the exhaust flow pattern. The cross section of FIG. 3 would alternate with the cross section of FIG. 1 in the same turbine engine.

FIG. 3 is an isometric cutaway view of a turbine engine in accordance with the first embodiment of the invention. The cross section of FIG. 3 is taken through the exhaust passages and shows only the exhaust flow pattern which was not shown in FIGS. 1 and 2.

With reference to FIG. 3, hot gases produced by combustion in the combustion chamber 30 are conducted through the nozzle guide vanes 36 which are interleaved between radial diffuser passages 38 in the stationary diffuser 24.

The shape and position of the nozzle guide vanes 36 adds rotation to the hot combustion gases from the combustion chamber 30 and directs the hot exhaust air flow through the nozzle guide vanes 36 onto the axial turbine blades 40 in the axial turbine passages 42.

The axial turbine passages 42 through the single rotor 16 are interleaved between the radial compressor passages 14 in the rotor 16, such that the axial turbine passages 42 and radial compressor passages 14 are in alternating order and equally spaced in the rotor 16.

The axial turbine blades 40 drive the single rotor 16 in a manner similar to that in which a conventional axial gas turbine is driven. The combustion gas flow is directed out of the turbine engine through an exhaust nozzle passage 44. The jet exhaust energy can be used to propel an aircraft or rotate a separate power turbine in the usual manner.

Figure 4:
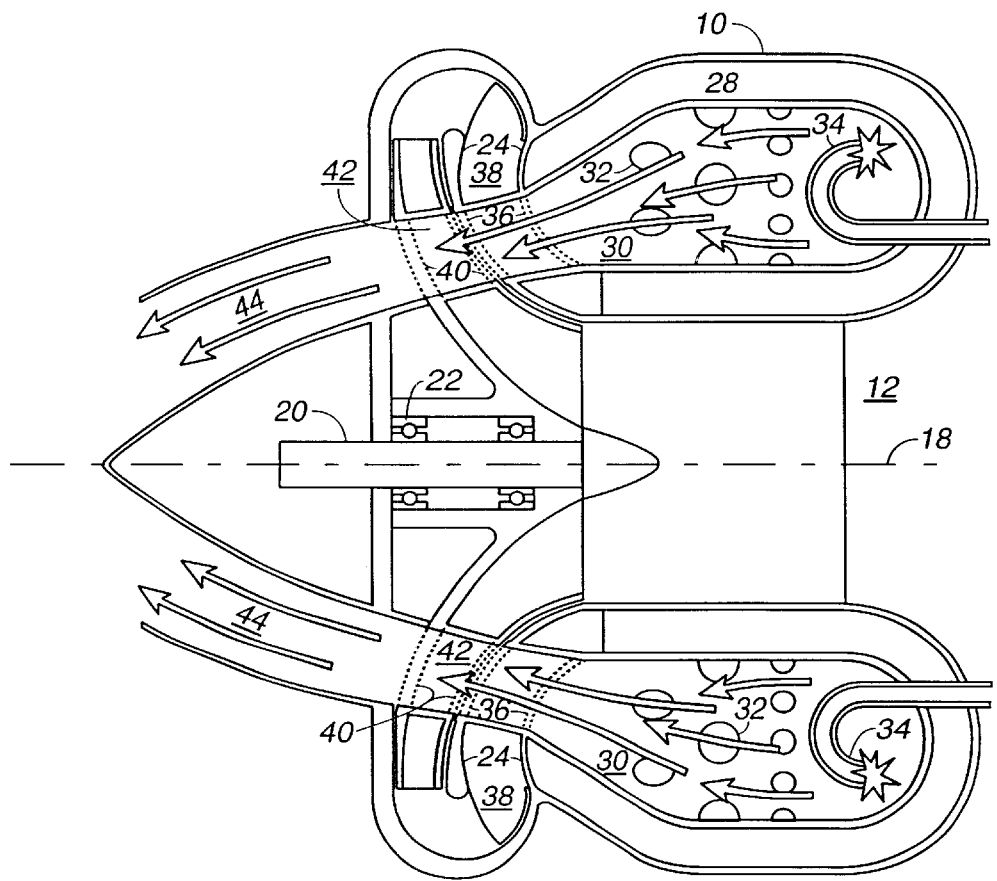
FIG. 4 is an orthogonal view of the cross section shown in FIG. 3.

FIG. 4 is an orthogonal view of the cross section shown in FIG. 3.

In a second embodiment of the invention, electrical generation capability is built into the single rotor of the turbine engine. An example of the second embodiment of the invention is shown in FIGS. 5 through 10. The configuration of the engine is similar to that of the embodiment shown in FIGS. 1 through 4, with the exceptions that the exhaust gas flow is directed into inward radial turbine passages which are shaped and arranged to transition into more axially oriented passages on the way out of the rotor; and the rotor has rotor face magnets embedded in the face of the exhaust side of the rotor.

Figure 5:
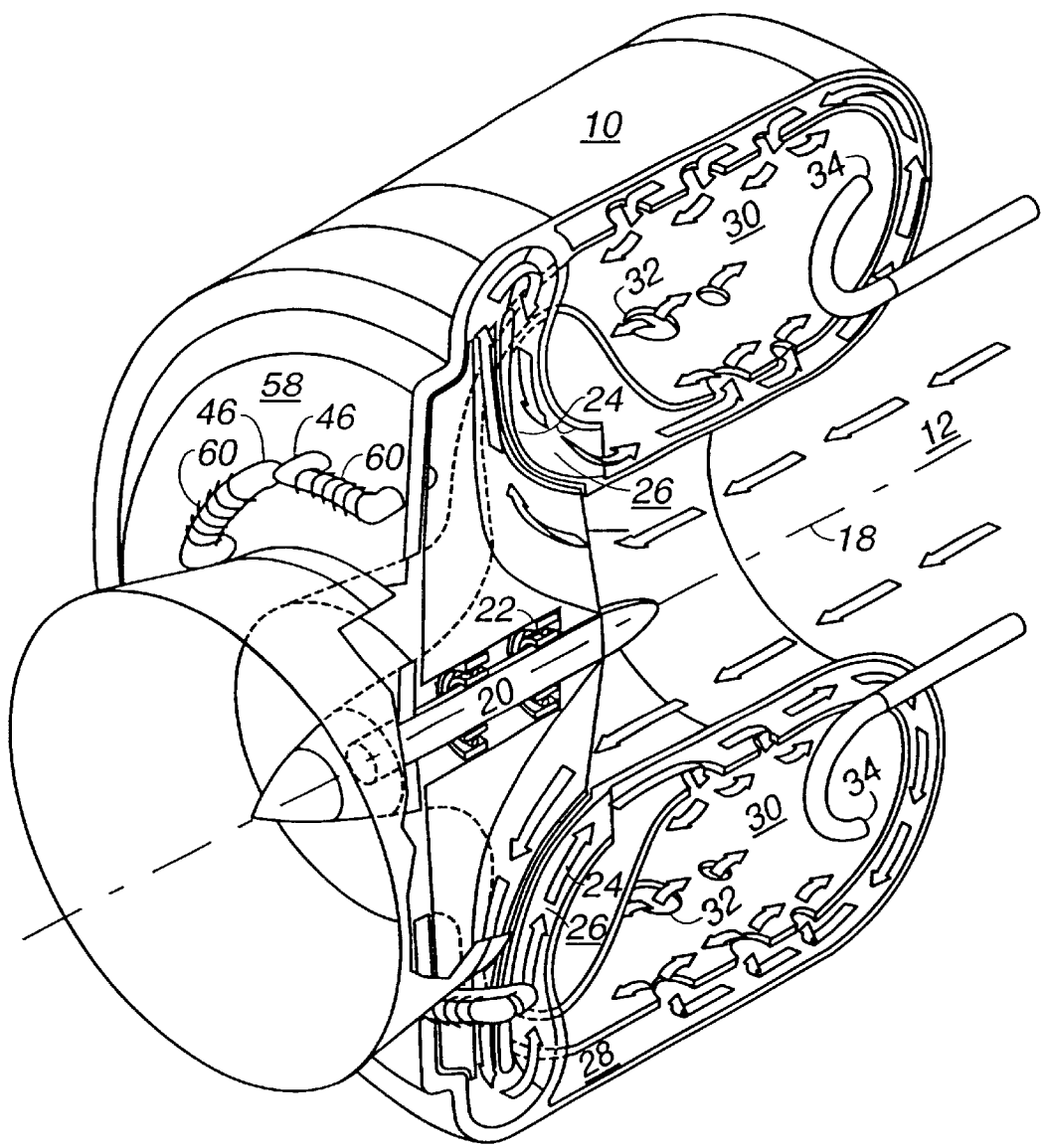
FIG. 5 is an isometric cutaway view of a turbine engine specifically adapted for generation of electricity in accordance with the second embodiment of the invention showing a cross section having only the intake flow pattern.

FIG. 5 is a cross section of the second embodiment of the invention. This cross section has only the intake flow pattern which is the same as the intake flow pattern for the first embodiment shown in FIG. 1. FIG. 5 also shows the magnetic cores 46 with wire windings 48 in the end of the engine housing 10 and exhaust face magnets 50 embedded in the face of the exhaust side 52 of the rotor 16.

Figure 6:
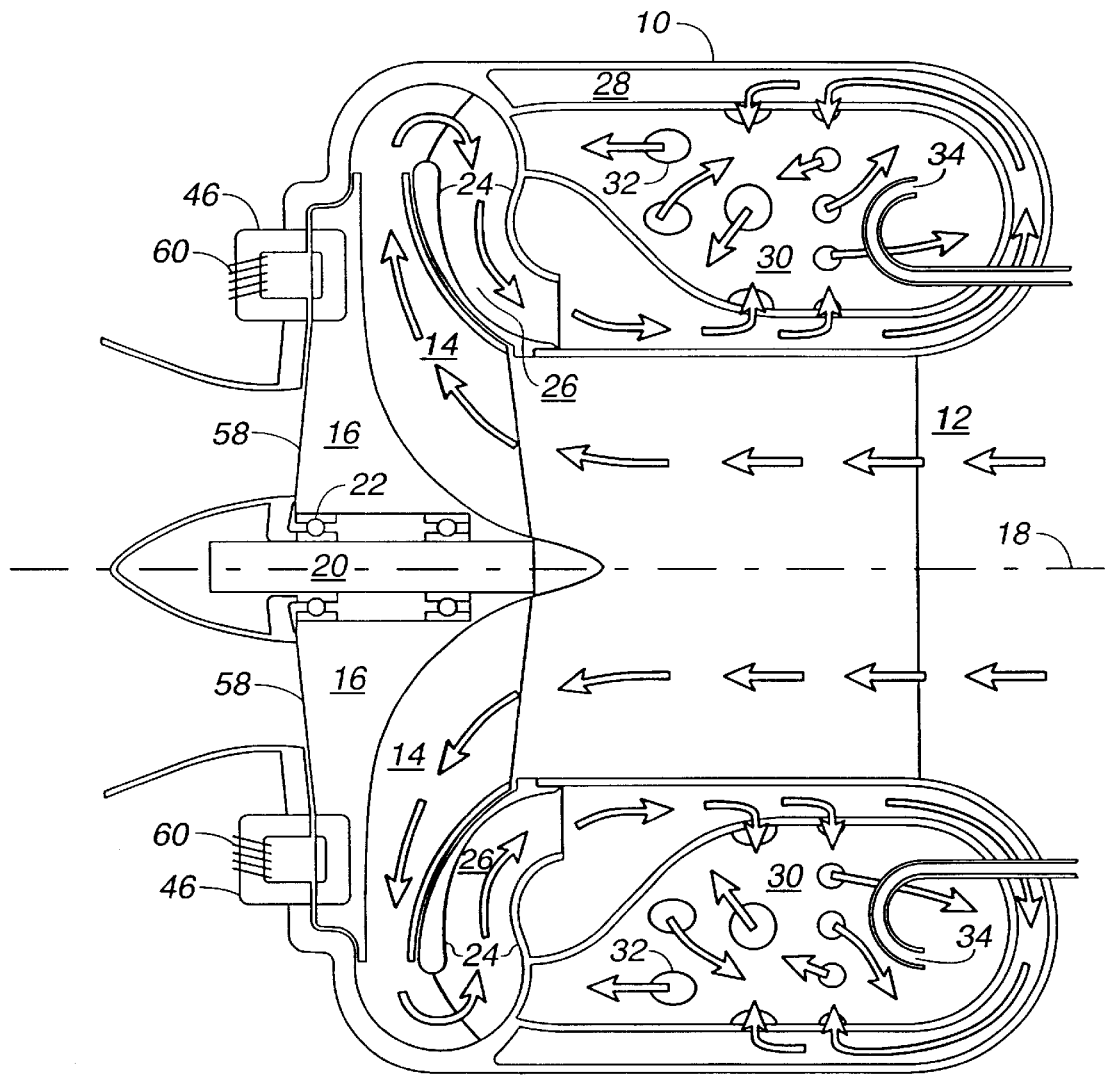
FIG. 6 is an orthogonal view of the cross section shown in FIG. 5.

FIG. 6 is an orthogonal view of the cross section shown in FIG. 5.

Figure 7:
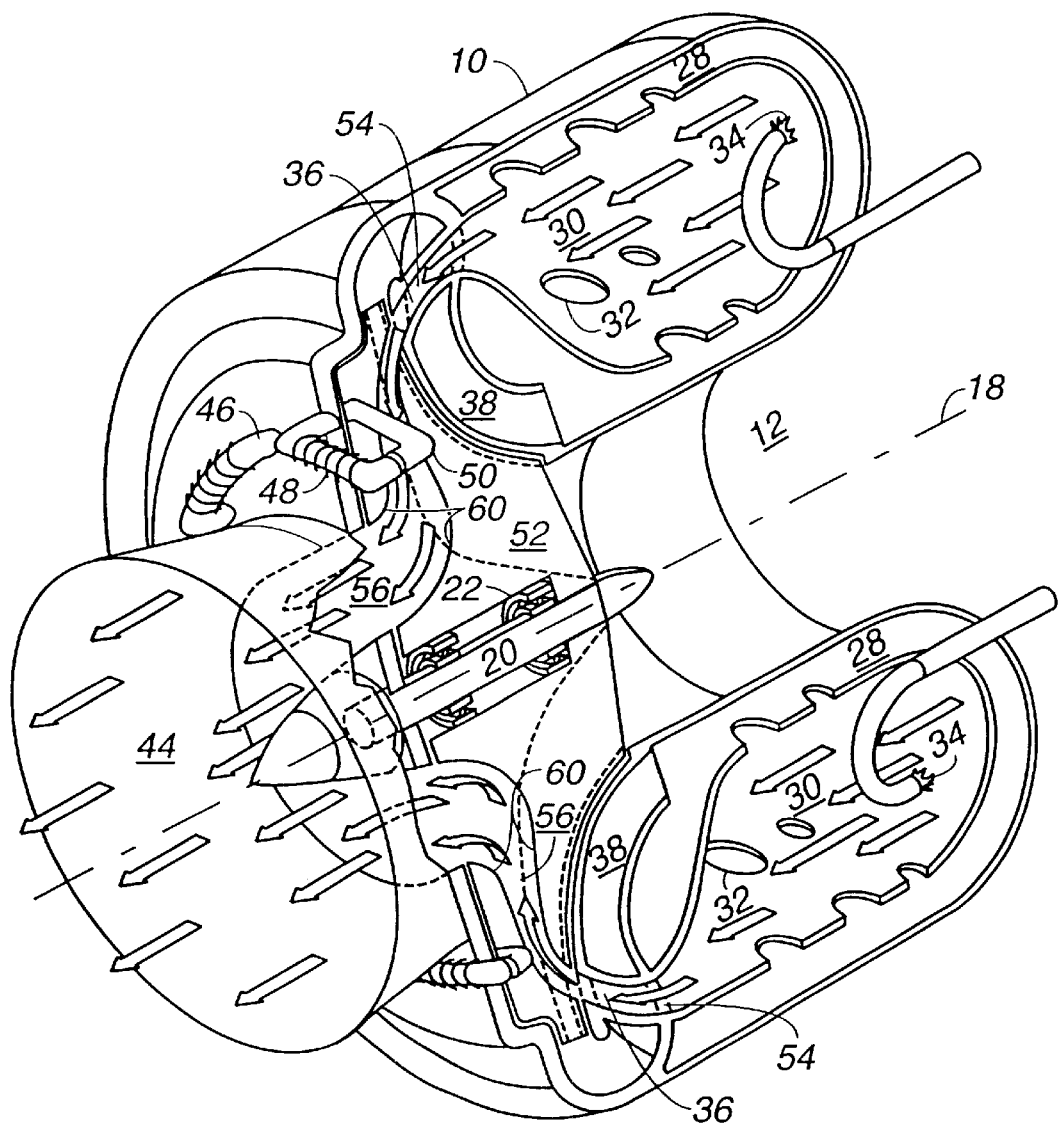
FIG. 7 is an isometric cutaway view of a turbine engine specifically adapted for generation of electricity in accordance with the second embodiment of the invention showing a cross section having only the exhaust flow pattern. The cross section of FIG. 7 would alternate with the cross section of FIG. 5 in the same turbine engine.

FIG. 7 is an isometric cutaway view of a turbine engine specifically adapted for generation of electricity in accordance with the second embodiment of the invention showing a cross section having only the exhaust flow pattern. The exhaust flow pattern of the second embodiment of the invention provides for a radial inflow turbine rather than an axial turbine.

With reference to FIG. 7, hot gases produced by combustion in the combustion chamber 30 are conducted through the nozzle guide vanes 36 which define radial diffuser passages 38 that are interleaved between the nozzle guide vanes 36.

The shape and position of the nozzle guide vanes 36 adds rotation to the hot combustion gases from the combustion chamber 30 and directs the hot exhaust air flow 54 onto the radial turbine blades 60 in the inward radial turbine passages 56. The inward radial turbine passages 56 are shaped and arranged to transition into more axially oriented passages on the way out of the rotor 16.

The inward radial turbine passages 56 through the single rotor 16 are interleaved between the radial compressor passages 14 in the rotor 16, such that the inward radial turbine passages 56 and radial compressor passages 14 are in alternating order and equally spaced in the rotor 16.

The radial turbine blades 60 drive the single rotor 16 in a manner similar to that in which a conventional axial gas turbine is driven. The combustion gas flow is directed out of the turbine engine through an exhaust nozzle passage 62.

Still with reference to FIG. 7, the exhaust face magnets 50 are in rotational proximity with stationary magnetic cores 46 in a stationary plate or ring 58 which can be an integral part of the housing 10. The stationary magnetic cores 46 are wound with alternator windings 48.

As the rotor 16 rotates it moves the magnets 50 embedded in the rotor face 52 past the stationary wound cores 46. The magnets 50 in the rotor face 52 are arranged with alternating polarity so that they induce an alternating magnetic field in the wound cores 46 as the magnets 50 rotate past the wound cores 46. The alternating field induces electric current in the windings 48 on the cores 46.

Figure 8:
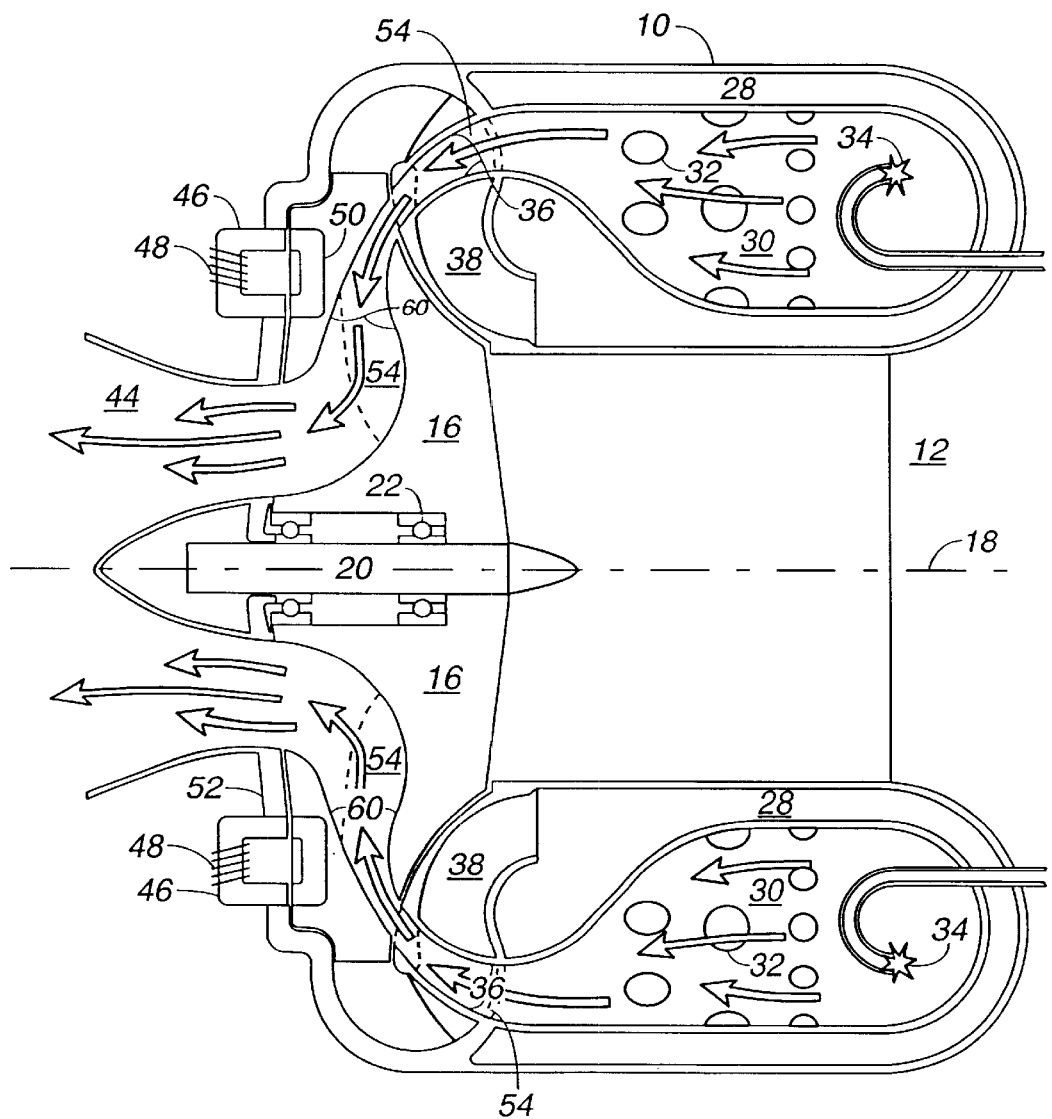
FIG. 8 is an orthogonal view of the cross section shown in FIG. 7.

FIG. 8 is an orthogonal view of the cross section shown in FIG. 7.

Figure 9:
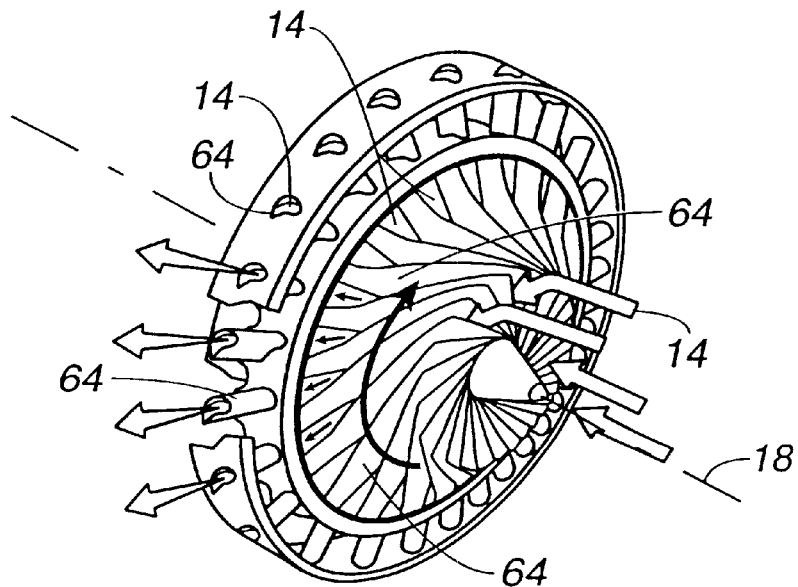
FIG. 9 is an enlarged view of the intake side of a rotor for a turbine engine in accordance with the second embodiment of the invention.

FIG. 9 is an enlarged view of the intake side of a rotor for a turbine in accordance with the second embodiment of the invention.

Figure 10:
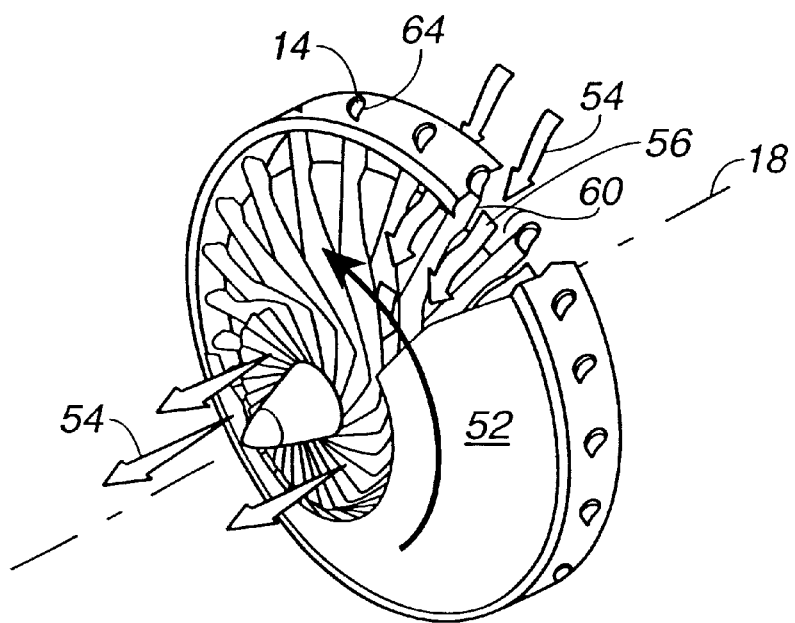
FIG. 10 is an enlarged view of the exhaust side of a rotor for a turbine engine in accordance with the second embodiment of the invention.

FIG. 10 is an enlarged view of the exhaust side 52 of a rotor for a turbine in accordance with the second embodiment of the invention. As in FIG. 9, the magnets are not shown here for simplification of the drawing. Again, the radial compressor passages 14 are interleaved between the radial compressor vanes 64. The exhaust gas flow 54 is shown entering and exiting the rotor.

While the apparatuses and methods of this invention have been described in detail for the purpose of illustration, the inventive apparatuses and methods are not to be construed as limited thereby. The claims of this patent are intended to cover all changes and modifications within the spirit and scope thereof.

INDUSTRIAL APPLICABILITY

The invention gas turbine engines are lighter and more efficient than state of the art turbine engines. The invention gas turbine engines are particularly useful in air vehicles and portable power applications.

What is claimed is:
1. A gas turbine comprising:
an air inlet;
a radial compressor having radial compressor passages;
an annular combustor substantially defining said air inlet inside its inner annulus;
radial diffuser passages between said compressor and said combustor;
an axial turbine having axial turbine passages that are equally spaced and interleaved between said radial compressor passages;
nozzle guide vanes between said combustor and said turbine, said guide vanes being interleaved between said radial diffuser passages;
an air outlet;
said radial compressor and said axial turbine being made in substantially one disk.

* * * * *